(12) United States Patent
Klutinus et al.

(10) Patent No.: US 11,784,366 B2
(45) Date of Patent: Oct. 10, 2023

(54) BATTERY MODULE

(71) Applicant: Dr. Ing. h.c. F. Porsche Aktiengesellschaft, Stuttgart (DE)

(72) Inventors: Rüdiger Klutinus, Pforzheim (DE); Dominik Grass, Bietigheim-Bissingen (DE); Christian Wendland, Grafenau (DE); Michael Englmeier, Lenting (DE); Tim Schmidt, Freiberg am Neckar (DE); Jens Maurer, Renningen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 169 days.

(21) Appl. No.: 17/368,973

(22) Filed: Jul. 7, 2021

(65) Prior Publication Data
US 2022/0013822 A1 Jan. 13, 2022

(30) Foreign Application Priority Data
Jul. 8, 2020 (DE) .................... 10 2020 118 002.0

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS

2005/0089750 A1* 4/2005 Ng .................... H01M 10/6557
429/62
2012/0219839 A1* 8/2012 Kritzer .............. H01M 10/0468
429/120
(Continued)

FOREIGN PATENT DOCUMENTS

DE 102018133004 A1 6/2020

OTHER PUBLICATIONS

Wikipedia, "Polyurethane", https://en.wikipedia.org/wiki/Polyurethane, with translation, downloaded from the internet, May 17, 2021, 20 pages.

*Primary Examiner* — Gregg Cantelmo
(74) *Attorney, Agent, or Firm* — RatnerPrestia

(57) ABSTRACT

A battery module with a battery cell stack which is formed from a plurality of battery cells, with deformable foam plates which are arranged between in each case adjacent battery cells for the compensation of deformations of the battery cells during their charging and discharging or on account of their aging. A cooling medium is conducted between respective adjacent battery cells in order to cool the battery cells. The cooling medium is a cooling liquid which makes direct contact with the battery cells. A cooling structure for conducting the cooling liquid to the battery cell and along the latter is arranged between the respective battery cell and the foam plate which faces it. The foam plate makes contact with the cooling structure, and the cooling structure making contact with the battery cell.

5 Claims, 2 Drawing Sheets

(51) Int. Cl.
  *H01M 50/211* (2021.01)
  *H01M 50/242* (2021.01)
  *H01M 10/647* (2014.01)
  *H01M 10/653* (2014.01)
  *H01M 10/6567* (2014.01)

(52) U.S. Cl.
  CPC ..... *H01M 10/653* (2015.04); *H01M 10/6567* (2015.04); *H01M 50/211* (2021.01); *H01M 50/242* (2021.01); *H01M 2220/20* (2013.01)

(56) References Cited

U.S. PATENT DOCUMENTS

| | | | |
|---|---|---|---|
| 2013/0022845 A1* | 1/2013 | Davis | H01M 50/579 |
| | | | 429/96 |
| 2013/0071718 A1* | 3/2013 | Cho | H01M 10/6555 |
| | | | 429/120 |
| 2013/0101881 A1* | 4/2013 | Syed | H01M 50/291 |
| | | | 29/890.03 |
| 2017/0194681 A1 | 7/2017 | Kim et al. | |
| 2018/0034116 A1* | 2/2018 | Tajima | H01M 10/6569 |

\* cited by examiner

BATTERY MODULE

CROSS-REFERENCE TO RELATED APPLICATION

This application claims priority to German Patent Application No. 10 2020 118 002.0, filed Jul. 8, 2020, the content of such application being incorporated by reference herein in its entirety.

FIELD OF THE INVENTION

The invention relates to a battery module with a battery cell stack which is formed from a plurality of battery cells, with deformable foam plates which are arranged between in each case adjacent battery cells for the compensation of deformations of the battery cells during their charging and discharging or on account of their aging, and with a cooling medium which is conducted through between respective adjacent battery cells in order to cool the battery cells.

BACKGROUND OF THE INVENTION

US 2013/0071718 A1, which is incorporated herein by reference, discloses a battery module of this type. In the case of said battery module, a deformable foam plate is arranged between in each case two battery cells which are arranged adjacently, which foam plate bears directly against said two battery cells. The deformable foam plate has passages which penetrate it for conducting through cooling medium, said cooling medium being cooling air. The passages are positioned parallel to the contact faces of the deformable foam plate with the two battery cells. Said battery cell is used in the case of electric vehicles, for example, passenger motor cars, buses and trucks.

US 2017/0194681 A1, which is incorporated herein by reference, discloses a battery module with a battery stack which is formed from a plurality of battery cells and with cooling structures which are arranged between respective adjacent battery cells. The respective cooling structure is configured as a closed structure with an inflow and outflow for a cooling liquid. The cooling structure which is arranged between respective adjacent battery cells makes contact with said battery cells directly. In the region of one stack end of the battery cell stack, the battery module has an insulating plate made from a foamed material for impact absorption of the battery cell stack.

SUMMARY OF THE INVENTION

It would be desirable to develop a battery module of the type mentioned in the Background in such a way that an optimum compensation of deformations of the battery cells during their charging and discharging or on account of their aging and optimum cooling of the battery cells are ensured.

In the case of the battery module according to aspects of the invention, it is provided that the cooling medium is a cooling liquid which makes direct contact with the battery cells, a cooling structure for conducting the cooling liquid to the battery cell and along the latter being arranged between the respective battery cell and the foam plate which faces it, said foam plate making contact with said cooling structure, and the cooling structure making contact with said battery cell.

The battery cells can therefore expand, for example, during charging of the battery cells, whereby the battery cells act on the cooling structures and the latter act in turn on the foam plates. Since the foam plates are deformable, they can change their shape in accordance with the space which is required as a result of the expansion of the battery cells, and are therefore compressed to a greater extent. If, in contrast, the battery cells are deformed in another operating state in the sense of a thickness reduction of the battery cells, the foam plates are relieved again to a more pronounced extent, and deformed back into their starting state.

The cooling liquid can particularly advantageously cool the battery cells because the cooling liquid makes direct contact with the battery cells. On account of the arrangement of the cooling structure between the foam plate and the associated battery cell, the foam plate cannot be locked, in particular in that region of the cooling structure which faces the battery cells. This danger would exist in the case of direct contact of the foam plate and the battery cell.

It is provided, in particular, that the respective battery cell is a pouch cell. This is distinguished by a relatively small thickness in the case of relatively great width and length, in the case of a substantially rectangular configuration of the surface which is formed by way of the width and the length, moreover, in particular, by electric connectors in the region of a narrow side of the pouch cell.

The respective cooling structure preferably has a plate at least on its side which faces the battery cell, which plate bears against said battery cell, said plate having passages for the cooling liquid. This design ensures an advantageous support of the cooling structure in the battery cell with simultaneous favorable throughflow of the plate with cooling liquid. One advantageous development provides that said cooling structure has a plate on its side which faces away from said battery cell, which plate bears against the foam plate which faces said battery cell on said side of the battery cell. As a result of this design of the cooling structure, forces can be transmitted over a great area from the foam plate which is as a rule softer into the usually rigid cooling structure, in the case of the deformation of the battery cells, and can be forwarded from said cooling structure into the battery cell. The plate which passes into contact with the foam plate is, in particular, of closed configuration, and therefore has no passages because it is not necessary to convey the cooling liquid in the region of the foam plate.

The respective plate is preferably configured as a metal sheet. In this way, it can particularly satisfactorily transport the heat from the associated battery cell into the cooling structure and therefore the cooling liquid.

The respective plate is preferably configured as a profiled plate. The profiling allows the cooling structure to be positioned, in particular, with regard to the associated battery cell in such a way that the plate bears against the battery cell only in projecting profile regions of the plate. Therefore, the cooling liquid can be conducted through between the plate and the battery cell between the projecting regions of the plate.

It is provided, in particular, that the plates of the cooling structure are connected to one another and form a stable unit. In particular, the plates are of corrugated configuration and are connected to one another directly.

Fundamentally, in accordance with an alternative design, the cooling structure can also have only a single profiled plate, in particular a single profiled sheet metal plate. Said profiled plate is supported both on the battery cell and on the foam plate. In this case, the cooling liquid makes contact both with the battery cell and with the foam plate. The profiled plate of the cooling structure prevents locking of the cooling structure toward the battery cell, whereby long-term conducting of the cooling liquid between the cooling structure and the battery cell is ensured.

The foam plate is preferably formed from a microcellular polyurethane. The latter is available commercially, for example, under the brand "PORON" (Rogers Corporation, AZ 85224 Chandler, USA).

BRIEF DESCRIPTION OF THE DRAWING

Further features of the invention result from the appended drawing and the description of the exemplary embodiment which is reproduced in the drawing, without being restricted thereto.

In the drawing.

DETAILED DESCRIPTION OF THE INVENTION

Figure 1:
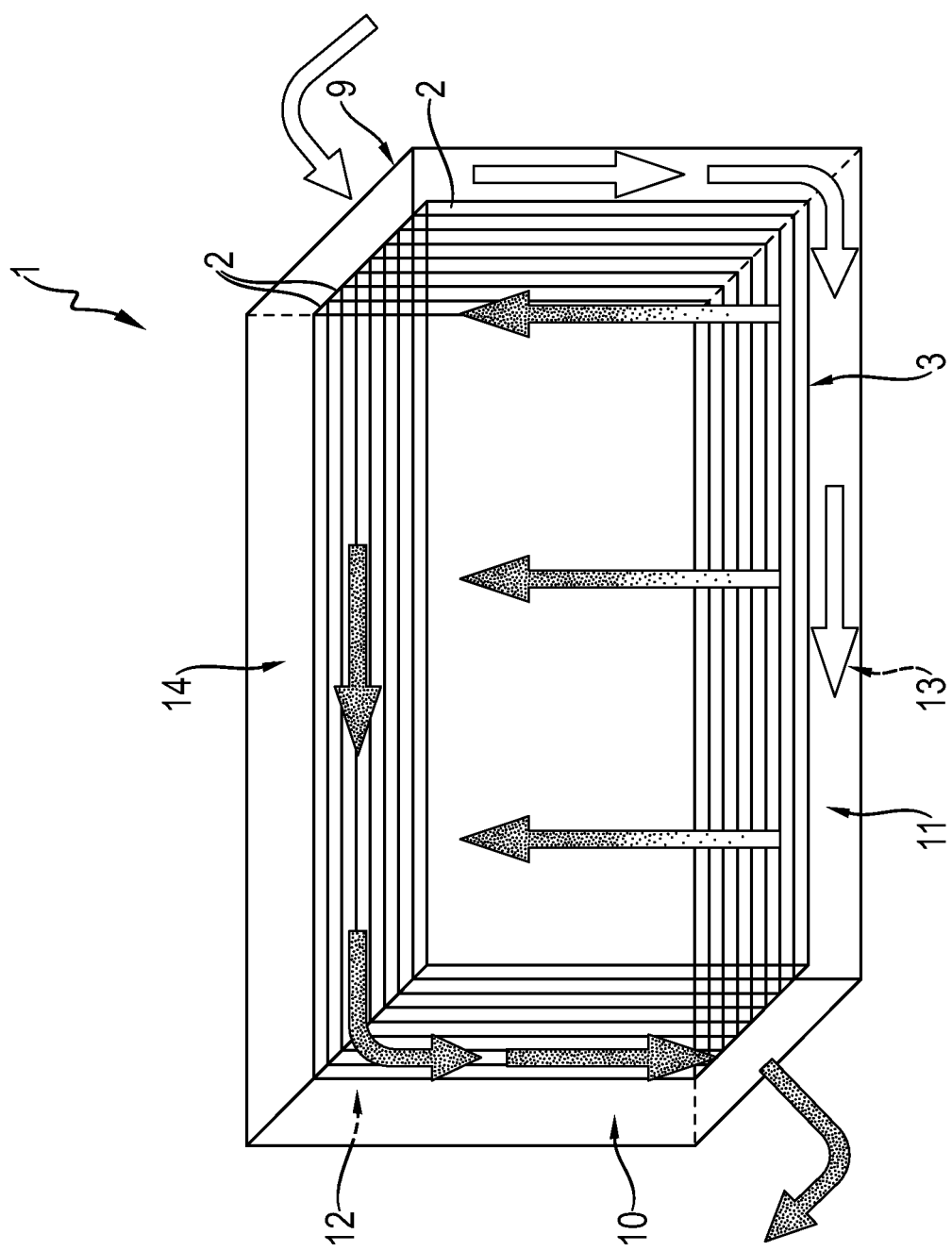
FIG. 1 shows a greatly simplified illustration of a battery module with an illustrated throughflow of the battery module.

The battery module 1 which is shown in FIG. 1 is used, in particular, in the case of a vehicle which can be driven electrically, for example a passenger motor vehicle, in order to drive an electric machine of the vehicle.

The battery module 1 has a battery cell stack 3 which is formed from a plurality of battery cells 2. The battery cells 2 are configured as pouch cells. Deformable foam plates 4 are arranged between respective adjacent battery cells 2 of the battery cell stack 3 for the compensation of deformations of the battery cells 2 during their charging and discharging or on account of their aging. A cooling medium which is a cooling liquid 5 is conducted through between respective adjacent battery cells 2 in order to cool the battery cells 2.

Figure 2:
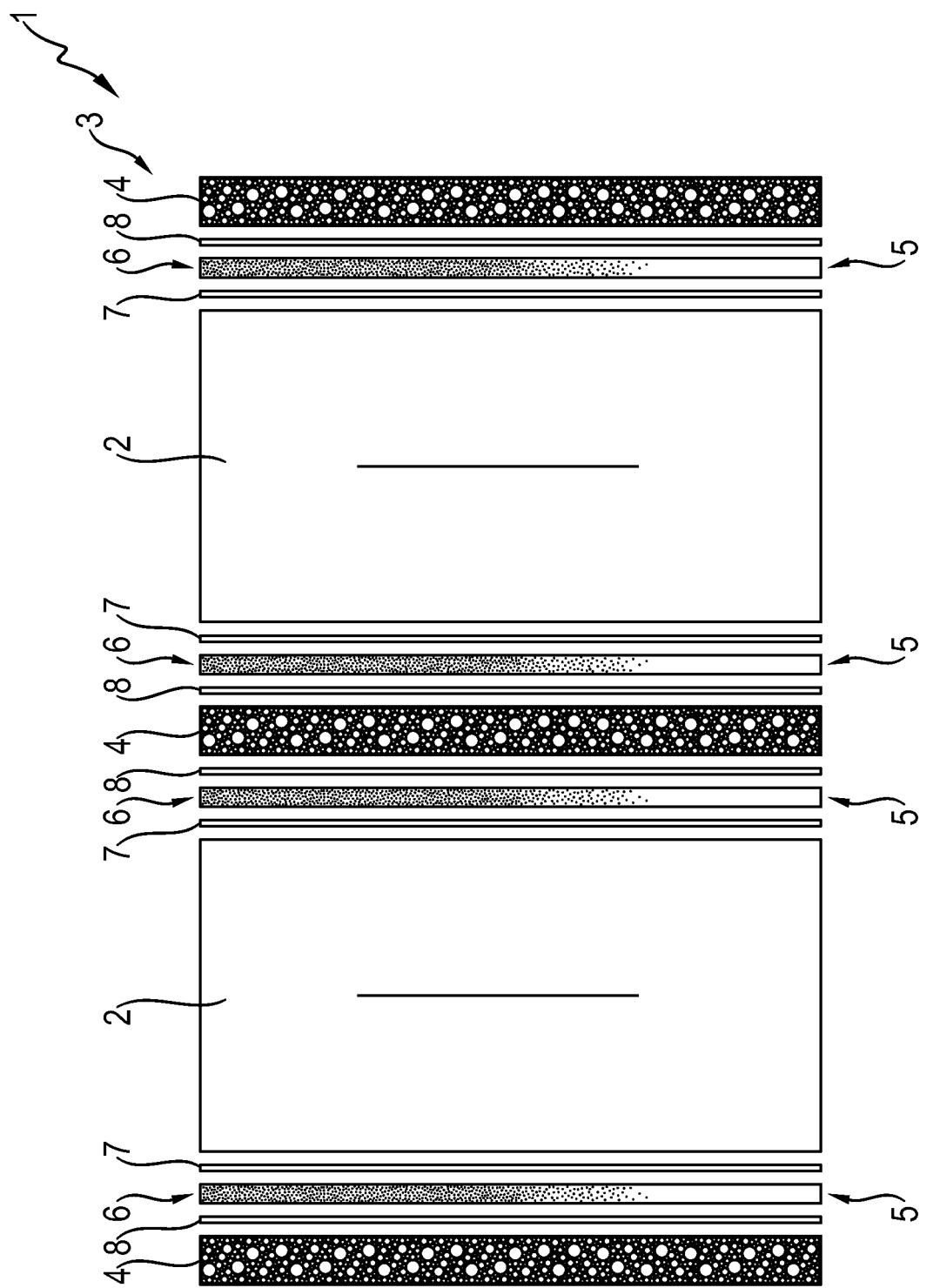
FIG. 2 shows a diagrammatic illustration of the construction of the battery module in the region between two battery cells.

FIG. 2 shows a diagrammatic illustration of the construction of the battery module 1 in the region of two adjacent battery cells 2. This also applies correspondingly to the other respective adjacent battery cells 2 of the battery cell stack 3: the cooling liquid 5 makes direct contact with the battery cells 2. A cooling structure 6 for conducting the cooling liquid 5 to the battery cell 2 and along the latter is arranged between the respective battery cell 2 and the foam plate 4 which faces it. Said foam plate 4 makes contact with said cooling structure 6, and the cooling structure 6 makes contact with said battery cell 2. On its side which faces the battery cell 2, the cooling structure 6 has a plate 7 which bears against said battery cell 2. The plate 7 has passages (not illustrated) for the cooling liquid 5. On its side which faces away from said battery cell 2, the cooling structure 6 has a plate 8 which bears against the foam plate 4 which faces said battery cell 2 on said side of the battery cell 2.

The respective plates 7, 8 are configured as a metal sheet and moreover, are of profiled design. The cooling structure 6 which is arranged in each case between a battery cell 2 and the foam plate 4 is designed in such a way that its plates 7, 8 are connected to one another and form a stable unit. Here, the plates 7, 8 are of corrugated configuration and are connected to one another directly. This ensures that the cooling structure 6 bears against the associated battery cell 2 and the associated foam plate 4, and a throughflow of the cooling structure 6 with cooling liquid 5 takes place here.

The foam plate 4 is formed from a microcellular polyurethane.

The described arrangement of the battery cells 2, the foam plates 4 and the cooling structures 6 of the battery module 1 allow an optimum compensation of deformations of the battery cells 2 during their charging and discharging or on account of their aging and, furthermore, an optimum cooling of the battery cells 2.

FIG. 1 illustrates the flow conditions of the cooling liquid 5 in the battery module 1. On account of the battery cell stack 3 which is formed, the cuboid battery module 1 has a first end face 9, a second end face 10 which lies opposite said first end face 9, a front side face 11, a rear side face 12, a bottom face 13 and a top face 14. Via an access for cooling liquid 5, the latter flows into the interior of the battery module 1 in the region of its end face 9 along battery cell terminals which are therefore forcibly flowed over, in order to likewise ensure their cooling. The cooling liquid 5 passes from the region of the end face 9 into the region of the bottom face 13, and flows from there through the various cooling structures 6 to the top face 14. Heated cooling liquid 5 passes from the region of the top face 14 to the end face 10, and is discharged there from the battery module 1. The flow directions of the cooling liquid 5 are illustrated in FIG. 1 by means of the arrows which are shown with a thick line.

What is claimed:

1. A battery module comprising:
   a battery cell stack which includes battery cells,
   a deformable foam plate that is arranged between the battery cells, wherein the deformable foam plate is configured to compensate for deformations of the battery cells during their charging and discharging or on account of aging of the battery cells,
   a cooling medium passageway extending between the battery cells through which a cooling medium is conducted between the battery cells in order to cool the battery cells, wherein the cooling medium is a cooling liquid which makes direct contact with the battery cells via the cooling medium passageway, and
   a cooling structure for conducting the cooling liquid to one of the battery cells and along said one of the battery cells, the cooling structure being arranged between said one of the battery cells and the deformable foam plate,
   wherein said deformable foam plate contacts said cooling structure, and the cooling structure makes contact with said one of the battery cells,
   wherein the cooling structure comprises a first cooling plate on a side of the cooling structure which faces said one of the battery cells, which first cooling plate bears against said one of the battery cells, said first cooling plate having passages for the cooling liquid,
   wherein said cooling structure has a second cooling plate on a side of the cooling structure which faces away from said one of the battery cells, which second cooling plate bears against the deformable foam plate.

2. The battery module as claimed in claim 1, wherein the deformable foam plate is compressible and re-expandable.

3. The battery module as claimed in claim 1, wherein each battery cell is a pouch cell.

4. The battery module as claimed in claim 1, wherein the second cooling plate is a metal sheet.

5. The battery module as claimed in claim 1, wherein the deformable foam plate is formed from a microcellular polyurethane.

\* \* \* \* \*